United States Patent [19]

Seibel et al.

[11] 4,190,763

[45] Feb. 26, 1980

[54] ELECTRICAL CIGAR LIGHTER FOR AUTOMOTIVE VEHICLE WITH SNAP DISC BIMETALLIC SWITCH MEANS

[75] Inventors: Georg Seibel; Günther Mues, both of Dreieich, Fed. Rep. of Germany

[73] Assignee: Schoeller & Co. Elektrotechnische Fabrik GmbH & Co., Frankfurt am Main, Fed. Rep. of Germany

[21] Appl. No.: 849,798

[22] Filed: Nov. 9, 1977

[30] Foreign Application Priority Data

Nov. 20, 1976 [DE] Fed. Rep. of Germany ....... 2652857

[51] Int. Cl.$^2$ .............................................. F23G 7/02
[52] U.S. Cl. .................................. 219/265; 219/264; 219/267; 337/89; 337/381
[58] Field of Search .................. 219/263–270; 337/16, 36–37, 52–53, 67, 85, 89, 105, 112, 333, 337, 343, 362, 365, 380–381

[56] References Cited

U.S. PATENT DOCUMENTS

| 2,207,601 | 7/1940 | Shakespeare et al. | 219/265 |
| 2,213,373 | 9/1940 | Bahr | 219/265 |
| 2,220,978 | 11/1940 | Shakespeare et al. | 219/265 |
| 2,248,017 | 7/1941 | Cohen | 219/265 |
| 3,760,150 | 9/1973 | Fenn et al. | 219/265 |

FOREIGN PATENT DOCUMENTS 1910949  5/1971  Fed. Rep. of Germany ........... 219/266

Primary Examiner—Volodymyr Y. Mayewsky
Attorney, Agent, or Firm—Toren, McGeady and Stanger

[57] ABSTRACT

An electrical cigar lighter for automotive vehicles is provided with a socket assembly and a plug assembly including a heater element adapted to be electrically heated when the plug assembly is in a connected position within the socket assembly. Electrical circuitry is provided within the socket assembly to effect electrical heating of the heater element. A bimetallic switch including a snap disc for making and breaking contact with the electrical circuitry in response to the temperature of the heating element is also provided in the socket assembly. A dish-shaped contact member formed as part of the heater element of the plug assembly operates to place the heater element in circuit with the electrical circuitry of the socket assembly. The invention particularly provides an electrical connector device disposed between the electrical circuitry of the socket assembly and the dish-shaped contact member of the plug assembly which is connected with and disconnected from the electrical circuitry of the socket assembly by operation of the snap disc of the bimetallic switch. The electrical connector device is also disposed to cooperate with the dish-shaped contact member of the heater element when the plug assembly is in the connected position within the socket assembly to enable electrical heating of the heater element.

6 Claims, 14 Drawing Figures

ELECTRICAL CIGAR LIGHTER FOR AUTOMOTIVE VEHICLE WITH SNAP DISC BIMETALLIC SWITCH MEANS

BACKGROUND OF THE INVENTION

The present invention relates generally to the structure of an electrical cigar lighter especially useful in motor vehicles which consists of a socket having a bimetallic switch in the form of a snap disc and a plug which is plugged into the socket in order to effect heating of a heater element within the plug. More specifically, the invention relates to the type of electrical cigar lighter which comprises a handle or knob on the plug which is axially movably arranged within a jacket and which operates against the action of a return spring. The plug comprises a heated or glowing element against which a cigar or other smoking item is placed for lighting, and the heater element in the plug is surrounded by a dish-shaped contact member or dish by which the heater element is placed in circuit with an electrical circuit within the socket which operates through a current source to effect heating of the heater element.

In a known cigar lighter of the prior art which includes a snap disc for making and breaking circuit contact, contact with the electrical circuit which heats the heater element is made between the dish or dish-shaped contact member of the heater element and the outer edge of the snap disc itself. This type of device is disclosed in German Pat. No. 2329269.

Under cold or unheated conditions, the snap disc of such a device will be placed in a first concave shape and will be located directly in front of the heater element. Due to radiation heat of the heater element, the snap disc absorbs heat and snaps to a second or convex shape. Thus, the contact between the snap disc and the dish of the heater element will be opened and current supply to the heater element will be interrupted.

Because the heat capacity of the snap disc is insignificant, quick interruption of the current supply is possible. Interruption of current is dependent upon the temperature of the heater element. Accordingly, lower dimensioning of the heat conductor forming the heater element is possible. That is, the heat conductor is dimensioned so that the resistance of the conductor will be such that with application of a battery voltage of, for example, 12 volts for a period of between about one or two seconds a temperature of between 600° C. and 1100° C. will be obtained at the heater element. This temperature is sufficient for effecting lighting of a cigarette.

Melting of the heat conductor is prevented by the quick reaction of the snap disc. However, in lighters of this type a disadvantage arises in that the surfaces or points of contact of the electrical circuitry will become dirty and coated with ash residue thereby impeding the making of contact of the electrical circuitry and resulting in uncertain functioning of the lighter.

There is, moreover, the disadvantage that the contact will burn because of thermic overload. In order to insure exact evenness or uniformity at annular surfaces of contact, expensive and precise manufacturing and assembly techniques for the dish member of the heater element and for the snap disc will be required. It has been found that these requirements are a prerequisite for efficient functioning and operation of the snap disc. Because of the manufacturing tolerances of the parts which are required in the socket and the plug, adjustment of the contact compression becomes extremely cumbersome and difficult. The snap disc located in the socket prevents the making of contact with commercially available plugs used for connecting other devices such as vacuum cleaners for automobiles, hand lamps, battery testers, razors or the like.

Accordingly, it is the aim of the present invention to provide a cigar lighter for an automotive vehicle which operates with a more secure and reliable contact-making function with the electrical components of the device while avoiding the disadvantages discussed above. The invention is intended to provide a ligher whose components may be easily and inexpensively manufactured and assembled and which facilitates quick heating of the heater element of the plug.

SUMMARY OF THE INVENTION

Briefly, the present invention may be described as comprising an electrical lighter especially for motor vehicles which comprises a socket assembly, a plug assembly including a heater element adapted to be electrically heated when the plug assembly is in a connected position within the socket assembly, electrical circuit means in the socket assembly to effect electrical heating of the heater element, bimetallic switch means including a snap disc for making and breaking contact with the electrical circuit means in response to the temperature of the heater element, a dishshaped contact member formed as part of the heater element for placing the heater element in circuit within the electrical circuit means, and electrical connector means disposed to be connected with and disconnected from the electrical circuit means by operation of the snap disc of the bimetallic switch means, with the electrical circuit means also being disposed to cooperate with the dish-shaped contact member of the heater element when the plug assembly is in the connected position within the socket assembly to provide electrial current for heating the heater element.

In the operation of the invention, when the socket assembly is in the condition where the heater element of the plug is unheated, the snap disc is located to make contact with the current source for heating the heater element. By bringing the plug so that the dish-shaped contact member of the heater element is brought into connecting engagement with the electrical connector means, current will be caused to flow through the heater element which will be placed in circuit with the electrical circuit means.

Because of the particular structural configuration of the present invention, the snap disc will be screened from the heater element and thus contamination due to ash residue will be effectively prevented. The edge of the dish-shaped contact member of the heater element does not require precise dimension and, therefore, cumbersome and expensive manufacturing techniques may be avoided and burning of the contacts is eliminated.

In an advantageous aspect of the invention, the electrical connector means are provided in the form of a contact plate having contact tongues for contact with the dish-shaped member of the heater element. The contact plate may be placed at the outer end of an insulation body located within the socket. The contact plate may comprise lips for engaging with slots of the insulation body. The contact plate may also comprise stops for the snap disc. Without the use of further fastening elements or welding connections, the snap disc may be loosely inserted between a middle contact pin, forming part of the electrical circuit means and located in the insulation body, and the contact plate. In the middle of the convex side of the snap disc there may be arranged a contact rivet which cooperates with the middle contact pin of the electrical circuit means. Contact compression may be achieved by bracing the snap disc between the contact disc and the middle contact pin. The bracing may correspond approximately to the thickness of the material of the snap disc.

In another embodiment of the invention, the snap disc may be riveted centrically on to the middle contact pin. In this embodiment, the snap disc may comprise tongues which are diametrically formed on the disc and which have contacts. When the snap disc is cold, these contacts close the circuit providing electricity for heating the heater element by touching the bottom side of the contact plate and open the circuit when the snap disc warms up.

In a third embodiment of the invention one or a plurality of contact tongues are arranged at the snapping side of the snap disc to cooperate with the dish-shaped member of the heater element. In this embodiment, contact compression may be fixed by the distance provided between the contact tongues and the diameter of the dish of the heated element. The distance between the two contact tongues may be established by means of a separator piece.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
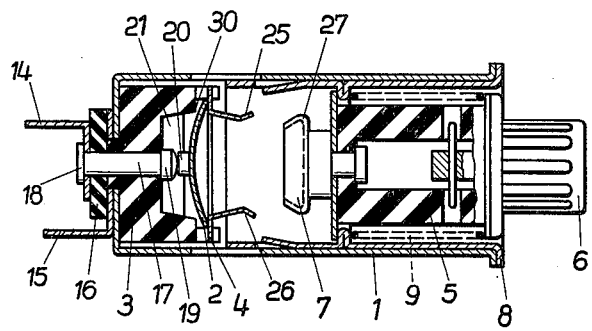
FIG. 1 is a longitudinal sectional view of a cigar lighter in accordance with the present invention shown in the switched-off position.
Figure 2:
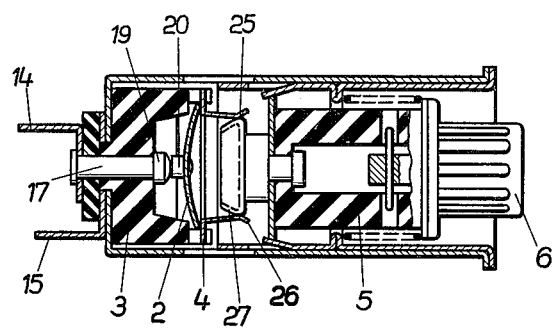
FIG. 2 shows the lighter of FIG. 1 in the switched-on position.

Referring now to the first embodiment of the cigar lighter in accordance with the present invention which is depicted in FIGS. 1-8, the lighter includes a socket assembly 1 which includes an insulation body 3 within which a plug assembly 5 may be operatively engaged in the operation of the lighter. The socket 1 includes a pair of contact lugs 14 and 15 which are electrically insulated from each other by an insulation disc 16 and which may be connected to a source of electrical current for providing the necessary energy to heat the lighter. A conductive pin 17 is located centrally of the insulation body 3 and projects through the middle thereof. The conductive pin 17 operates to attach the contact lugs 14 and 15 to the socket assembly and a head 18 of the conductive pin 17 located at one end thereof is seated in engagement with the contact lug 14. The other end of the pin 17 is shaped in the form of a contact 19 which cooperates with a contact member 20 of a bimetallic, temperature-responsive snap disc 2, shown in greater detail in FIGS. 7 and 8.

The contact member 20 is located in a recess 21 of the insulation body 3. In the circuit-closing or ambient-temperature position of the snap disc 2, the contacts 19 and 20 are brought into engagement in order to close a circuit and the edge of the snap disc 2 will press against a contact plate 4 which is arranged in the socket assembly 1. Contact tongues 25 and 26 project outwardly of the socket assembly and extend radially inwardly thereof in order to make and break contact by engagement with a dish-shaped contact member 27 of a heater element 7 which is a part of the plug assembly 5. When the plug assembly 5 is pressed inwardly into the socket assembly 1 with the snap disc 2 in the circuit-closing position shown in FIG. 2, the dish-shaped member 27 engages with the contact tongues 25 and 26 and an electrical circuit is formed whereby electrical energy operates the heater element 7 of the plug 5.

Figure 3:
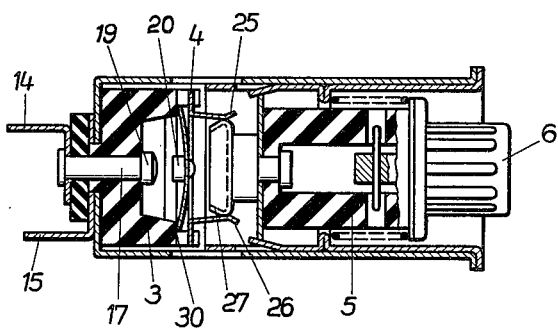
FIG. 3 shows the cigar lighter of FIG. 1 after the electrical circuit providing heating current for the lighter heater element has been broken by means of operation of the snap disc of the bimetallic switch means.

When a predetermined temperature has been reached, the snap disc 2 in response to the elevated temperature condtions snaps to the open-circuit position shown in FIG. 3 and the contacts 19 and 20 open in order to break the electrical circuit of the lighter. At the same time, the edge of the snap disc 2 rests against a shoulder 30 of the insulation body 3.

Accordingly, in the operation of the device of the invention, the plug assembly 5 may be gripped by means of a knob or handle 6 and inserted into the socket assembly against the action of a return spring 9 which is located in a plug jacket 8. With the plug 5 in the switched-on position shown in FIG. 2 with the snap disc 2 positioned so that the contacts 19 and 20 are in engagement, electrical current is delivered to the heater element 7. When a sufficiently high temperature has been reached, the snap disc 2 will snap to the position shown in FIG. 3 thereby separating the contacts 19 and 20 and breaking the circuit delivering electrical energy to the heater element 7.

Figure 4:
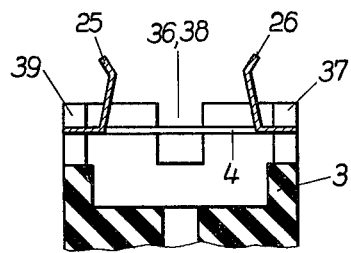
FIG. 4 is a partial sectional view of an insulation body located within the socket of the lighter shown with an attached contact plate.
Figure 7:
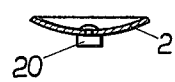
FIG. 7 is a sectional view of the snap disc used with the present invention.

In FIG. 4, the insulation body 3 and the contact plate 4 are shown in greater detail. It will be noted from the foregoing description that the contact plate 4 with the lugs or tongues 25 and 26 comprises electrical connector means interposed between the snap disc 2 and the dish-shaped member 27 of the heater element 7. Thus, the snap disc 2 is separated from the heater element 7 by the electrical connector means composed of the contact plate 4 with the contact tongues 25 and 26 and ash residue accumulating on the heater element 7 will not cause clogging or malfunction of the contact members 19 and 20.

Figure 5:
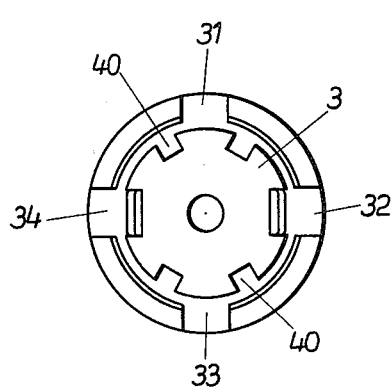
FIG. 5 is a top view of the contact plate shown in FIG. 4.
Figure 8:
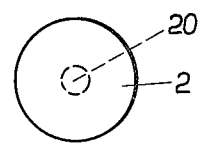
FIG. 8 is a top view of the snap disc of FIG. 7.
Figure 6:
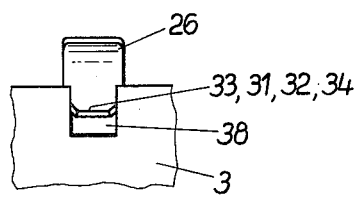
FIG. 6 is a detailed view depicting the manner whereby a lip of the contact plate is inserted to a slot of the insulation body.

As seen in FIGS. 4 to 6, the contact plate 4 is formed with lips 31–34 which engage within slots 36–39 of the insulation body 3. These slots are open at the top and the lips 31–34 are engaged therein with a force fit. The snap disc 2 may be loosely inserted between the insulation body 3 and the contact plate 4 and it will be operatively held therebetween without further fastening thereby rendering unnecessary connector elements or welding procedures. In order to insure that the snap disc 2, after snapping, remains inwardly of the contact plate 4, stops 40 are formed at the contact plate 4.

The contact compression between the contacts 19 and 20 is achieved by bracing the snap disc 2 between the contact plate 4 and the middle contact 19. The bracing which is developed is achieved by appropriately dimensioning the spacing between the contact plate 4 and the contact 19 taking into consideration the spring pressure developed by the snap disc 2. In other words, the distance between the contact disc 4 and the middle contact 19 will be sufficiently narrow so that when the snap disc 2 is in the ambient-temperature position shown in FIG. 1 the cold concave snap disc 2 will generate a spring force by virtue of being held in compression between the contact surface of the middle contact 19 and the contact plate 4.

During assembly, this distance may be exactly achieved by moving the lips 31–34 formed on the contact plate 4 in the slots 36–39 of the insulation body 3. The lips 31–34 are shaped in such a manner that they engage with the slots 36–39. When the snap disc 2 is heated by the radiation of the heater element 7, the snap disc 2 snaps into the convex shape and breaks the heating electrical circuit. The contact surfaces of the contact plate 4 and the upper edge of the concave snap disc 2 will exactly adapt to each other without there being required precise dimensioning of the parts during manufacture or during assembly. This is due to the fact that the loosely inserted snap disc 2 is supported by the contact member 19.

Because of the overall arrangement of the structure of the invention, both the contacts 19 and 20 will be located inwardly of the contact plate 4 and inwardly of the snap disc 2 and as a result they will be protected from ashes which may accumulate on the heater element 7. The edge of the dish-shaped member 27 of the heater element 7 does not require special shaping or configuring since the contact is made at the edge of the dish. Because of this construction of the contact plate 4 having contact tongues 25 and 26, it is possible to utilize within the socket assembly 1 plugs which may operate to connect therein devices other then the plug number 5. The contact resistance at the contact surfaces is defined by the actual annular contact of the edge of the snap disc 2 and the middle contact 20 of snap disc 2.

Figure 9:
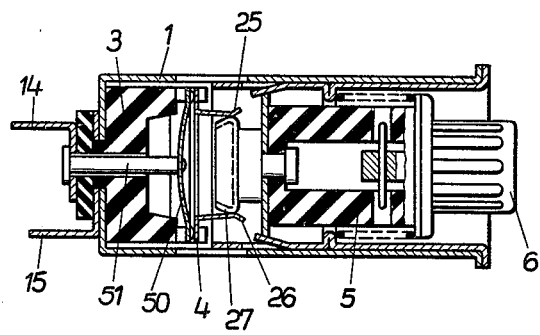
FIG. 9 is a longitudinal sectional view depicting another embodiment of the invention wherein the snap disc is mounted upon a middle contact pin of the electrical circuit means, with the units shown in the switched-on position.
Figure 10:
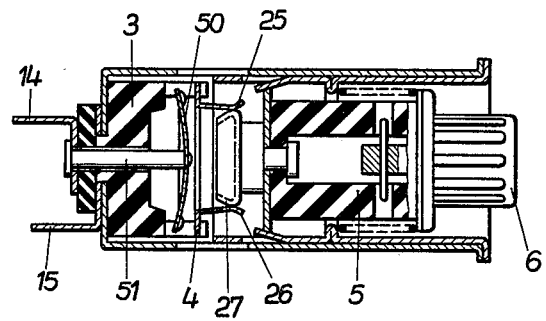
FIG. 10 is a longitudinal sectional view showing the lighter of FIG. 9 after the electrical circuit means providing current to heat the heater element has been disconnected by operation of the snap disc of the bimetallic switch.
Figure 11:
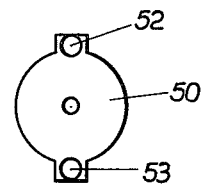
FIG. 11 is a top view of the snap disc of the bimetallic switch of the embodiment shown in FIG. 10 depicting contact tongues at the edge of the disc.

The second embodiment of the invention, which will give rise to advantages similar to those obtained from the first embodiment, is shown in FIGS. 9–11. In this embodiment, a snap disc 50 is utilized which is centrically riveted on to an electrically conductive pin 51. A pair of tongues 52 and 53 which are formed to extend radially outwardly from the snap disc 50 on diametrically opposite sides thereof are formed with contacts thereon. The contacts of the tongues 52, 53 engage against the inner side of the contact plate 4 under cold conditions of the lighter and thereby operate to close the heating electrical circuit means. During the heating, the heating electrical circuit will be broken by a snapping action of the snap disc 50 into the convex shape shown in FIG. 10. In the embodiment of FIGS. 9–11, the contacts of the snap disc 50 are also located such that they are protected from ash residue. The contact compression is adjusted in the same manner as that previously explained in connection with the embodiment according to FIGS. 1–8. Moreover, a round snap disc without contacts may be inserted in the same manner indicated.

Figure 12:
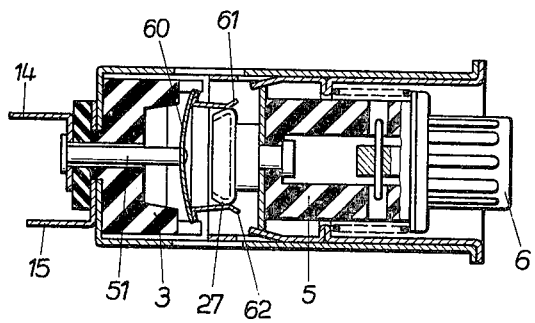
FIG. 12 is a longitudinal sectional view depicting the third embodiment of the invention wherein contact tongues which engage the dish-shaped member of the heater element are mounted on the snap disc of the bimetallic switch, the unit being shown in the switched-on position.
Figure 13:
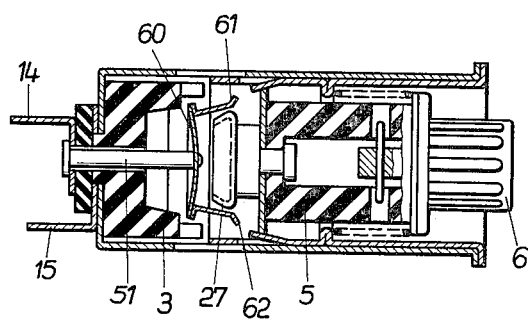
FIG. 13 is a longitudinal sectional view of the embodiment of FIG. 12 after the electrical circuit means which operates to heat the heater element has been disconnected by operation of the snap disc of the bimetallic switch.
Figure 14:
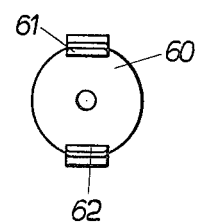
FIG. 14 is a top view of the snap disc of the embodiment shown in FIG. 12.

A third embodiment of the invention is shown in FIGS. 12–14. In this embodiment, a pair of contact tongues 61, 62 are mounted upon a snap disc 60. If desired, more than two contact tongues may be provided. The heating electrical circuit is closed at the points of contact between the dish-shaped member 27 of the heater element and the contact tongues 61, 62. When heated, the snap disc 60 will snap into the convex shape shown in FIG. 13 and will thereby interrupt current supply to the heater element by forcing the contact tongues 61, 62 apart and thereby bringing them out of engagement with the dish-shaped member 27. In the embodiment of FIGS. 12–14, the contact compression is determined by the distance between the contact tongues 61, 62 and by the diameter of the dish-shaped member 27 of the heater element. The diameter of the dish 27 can be precisely determined during manufacturing by utilizing simple drawing technology without requiring special measures. The distance between the two contact tongues 61, 62 can be established by mounting the tongues by means of a separator piece which is dimensioned true to measure without requiring adjustment. Precise axial mounting is also not required in this embodiment. The utilization of commercially available plugs of devices other than a lighter plug is also possible.

Of course, it should be understood that embodiments other than the three embodiments previously described may be developed by those having ordinary skill in the art without departing from the invention. Indeed, there may be a variety of possible variations in the construction of a cigar lighter and in the construction and arrangement of its parts without departing from the principles of the invention.

While specific embodiments of the invention have been shown and described in detail to illustrate the application of the inventive principles, it will be understood that the invention may be embodied otherwise without departing from such principles.

What is claimed is:

1. An electrical assembly for motor vehicles primarily adapted for use as a lighter for tobacco articles, comprising: a socket assembly; electrical circuit means having a contact member extending to within said socket assembly and including a source of electrical energy to effect energization of an electrical element placed in circuit therewith; a plug assembly adapted to be connected with said electrical circuit means thereby to effect electrical energization of an electrical element, said plug assembly including plug electrical contact means adapted to effect an electrical connection within said socket assembly; electrical connector means fixedly mounted within said socket assembly including first interconnection means adapted to have said plug electrical contact means placed into and out of electrical contact therewith and second interconnection means adapted to be electrically interconnected with said electrical circuit means; a bimetallic switching element shaped in the form of a disc and operating to snap between an ambient-temperature position and an elevated-temperature position in response to temperature levels within said socket assembly; and mounting means operatively maintaining said switching element within said socket assembly between said contact member of said electrical circuit means and said second interconnection means of said electrical connector means, said switching element being thereby mounted to make and break electrical interconnection between said contact member and said second interconnection means solely by means of said switching element snapping to said ambient-temperature position and to said elevated-temperature position, respectively, due to its innate temperature responsiveness; said electrical assembly being thereby operative to energize individually a plurality of different plug assemblies which are capable of being fitted into said socket assembly and which include plug electrical contact means operative to effect electrical connection with said first interconnection means of said electrical connector means.

2. An electrical assembly according to claim 1 wherein said contact member of said electrical circuit means is located generally centrally within said socket assembly, wherein said disc-shaped switching element includes a centrally located contact element thereon adapted to be brought into and out of electrical contact with said contact member of said electrical circuit means, and wherein said disc-shaped switching element also includes peripheral portions located radially outwardly of said centrally located contact element adapted to be brought into and out of electrical contact with said second interconnection means of said electrical connector means, with snapping of said switching element to said ambient-temperature position operating to effect electrical contact between said centrally located contact element of said switching element and said contact member of said electrical circuit means and between said peripheral portions of said switching element and said second interconnection means of said electrical connector means.

3. An electrical assembly according to claim 1 wherein said electrical connector means comprises a contact plate and wherein said first interconnection means comprise contact tongues extending from said plate for making contact with said plug electrical contact means of said plug assembly.

4. An electrical assembly according to claim 1 wherein said socket assembly includes a support body consisting of electrically insulating material and having said electrical connector means fixedly mounted therein, said support body defining together with said electrical connector means a generally annular slot having peripheral edge portions of said disc-shaped switching element operatively engaged therein, said annular slot being sized to maintain said switching element in operative relationship between said contact member of said electrical circuit means and said electrical connector means while permitting said switching element to snap between said ambient-temperature position and said elevated-temperature position to make and break electrical connection between said electrical circuit means and said electrical connection means.

5. An electrical assembly according to claim 1 wherein said bimetallic switching element is affixed to said contact member of said electrical circuit means at a centrally located portion of said switching element, said switching element including peripheral portions which are brought into and out of electrical connection with said second interconnection means of said electrical connector means when said bimetallic switching element snaps to said ambient-temperature position and said elevated-temperature position, respectively.

6. An electrical assembly according to claim 5 wherein said first interconnection means of said electrical connector means comprises a plurality of contact tongues arranged in a generally annular configuration to facilitate engagement of a generally annularly shaped member, wherein said plug electrical contact means of said plug assembly comprises a generally annularly shaped contact member adapted to be electrically engaged between said contact tongues of said electrical connector means and wherein said disc-shaped switching element is formed with diametrically extending tongues having contacts thereon which operate to make and break contact with said second interconnection means of said electrical connector means in accordance with the position of said switching element determined by the temperature within said socket assembly, said switching element being located on a side of said electrical connector means opposite the side thereof where said contact tongues are located.

* * * * *